Patented Feb. 14, 1939

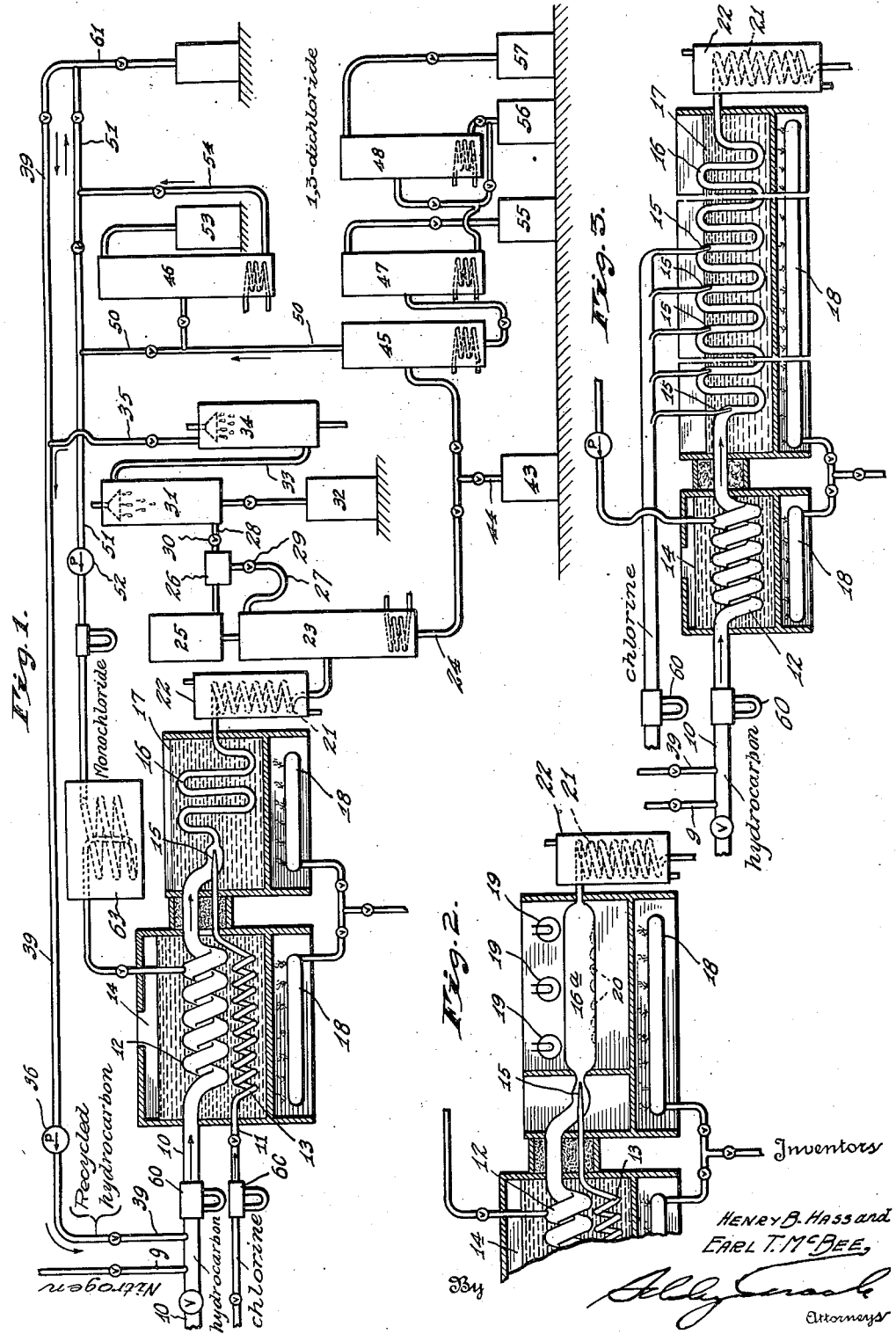

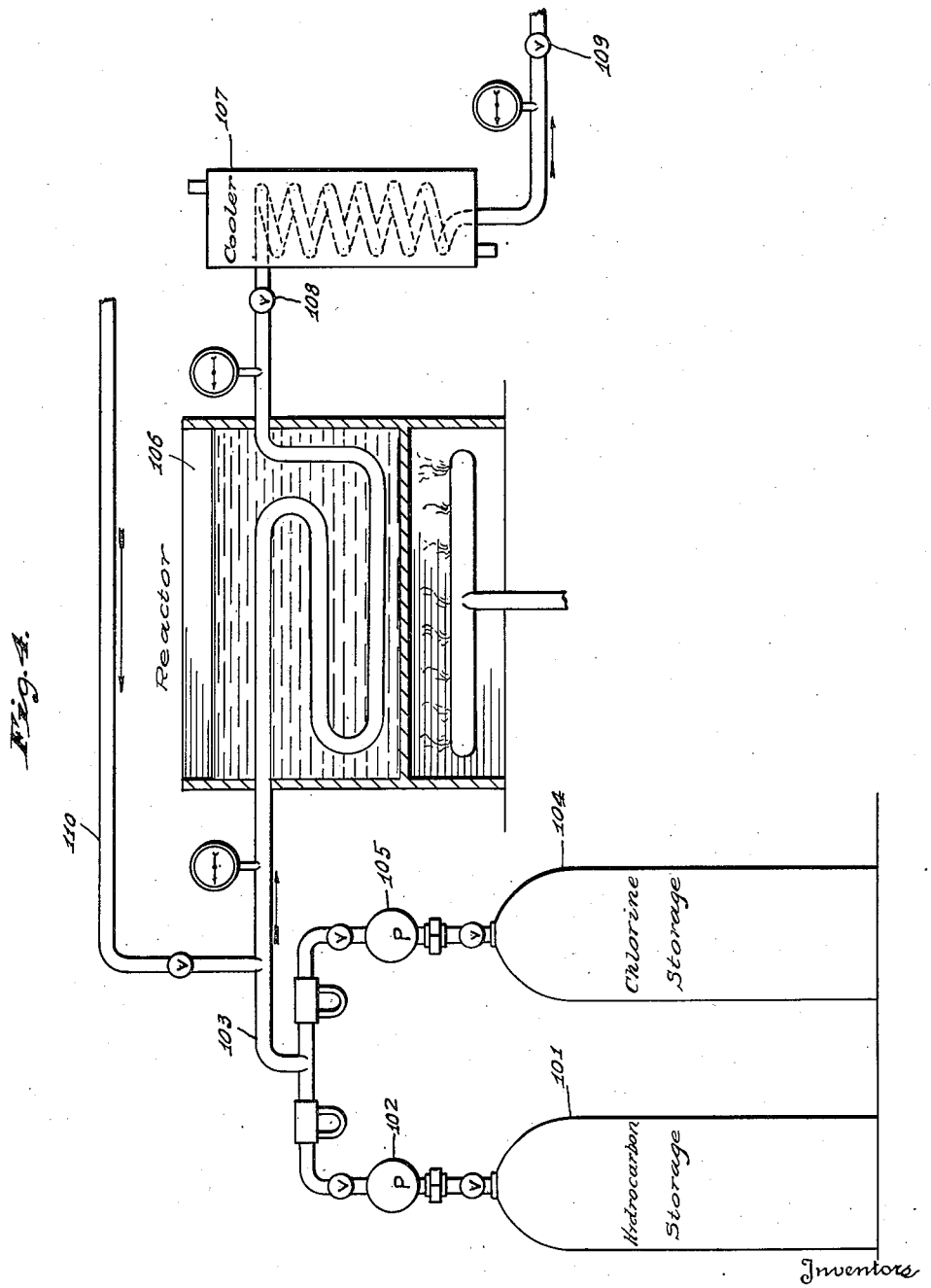

2,147,577

UNITED STATES PATENT OFFICE 2,147,577

PROCESS OF CHLORINATING PROPANE AND ISOBUTANE AND THEIR PARTIALLY CHLORINATED DERIVATIVES

Henry B. Hass and Earl T. McBee, West Lafayette, Ind., assignors to Purdue Research Foundation, West Lafayette, Ind., a corporation of Indiana Application May 3, 1935, Serial No. 19,546

16 Claims. (Cl. 260—660)

It is the object of our invention to synthesize 1,3-dichloropropane and 1,3-dichloro-2-methylpropane by the chlorination of propane and/or 1-chloropropane, and isobutane and/or 1-chloro-2-methylpropane, respectively.

This present application is a continuation in part of our earlier applications Serial No. 590,046, filed February 1, 1932, and No. 723,366, filed May 1, 1934, now Patent Nos. 2,004,072 and 2,004,073, respectively, both granted June 4, 1935.

While various hydrocarbons have been chlorinated for many years, prior to our work very little has been done in chlorinating isobutane. Two-thirds of a century ago, in 1867, Butlerow did indeed report (see Chemical Reviews, volume 8, p. 30, year 1931) that he chlorinated isobutane, by exposing a gaseous mixture of ten volumes of isobutane and nine volumes of chlorine to the action of daylight at room temperature; but, according to his report, 2-chloro-2-methylpropane (tertiary butyl chloride) and a more highly chlorinated liquid boiling at 105° (presumably 1,2-dichloro-2-methylpropane) were the only products obtained.

Similarly, prior to our work very little has been done in chlorinating propane. In that case also, there was a report of the chlorinating of propane about two-thirds of a century ago, when in 1869 Schorlemmer reported that he carried out such chlorination by the action of sunlight at room temperature on a gaseous mixture of chlorine and propane in a bell-jar; but, according to his report, the only di-chloride obtained was 1,2-dichloro-propane. (See summary in Chemical Reviews, vol. 8, pages 1–80, 1931, by Egloff, Schaad, and Lowry.)

Indeed, according to a commonly accepted rule for chlorination, (which rule is shown by our work to be erroneous), the only dichlorides obtainable by the chlorination of propane and isobutane are 1,2-dichloropropane and 1,2-dichloro-2-methylpropane respectively; so that according to that rule it was impossible so to obtain 1,3-dichloropropane or 1,3-dichloro-2-methylpropane. That commonly accepted rule with reference to the halogenation of alkyl halides—for in forming a dichloride of isobutane by chlorine substitution it is necessary to form first a monochloride—and is aptly summarized in the words of Herzfelder (quoted on page 4 of the summary in Chemical Reviews, volume 8, pp. 1 to 80, year 1931, by Egloff, Schaad, and Lowry):

"When in a monohalogen compound, a second halogen atom is introduced, it always attaches itself to that carbon atom which is situated next to the carbon atom already united with halogen."

This supposedly universal rule has seemed to be supported by many reports. Thus: Schöyen, (ibid. p. 29), in chlorinating n-butane, reported only "butylene dichloride" as a dichlorination product, and in any butylene dichloride the two chlorine atoms are necessarily on adjacent carbon atoms; Schorlemmer, (Phil. Trans. 18, 29 (1869)), in chlorinating propane reported only propylene dichloride (1,2-dichloropropane) as a dichlorination product; and Butlerow, when he chlorinated isobutane many years ago, reported only a liquid boiling at 105° C., presumably 1,2-dichloro-2-methylpropane (isobutylene dichloride), as a dichlorination product. The Sharples Solvents Corporation (Bulletin "Chemicals Derived from the Pentanes") lists only 1,2-dichloropentane, 2,3-dichloropentane, and 2,3-dichloro-2-methylbutane, as dichlorides produced in the chlorination of a mixture of n-pentane and iso-pentane. In all these no dichlorination is reported in which chlorine is substituted on two non-adjacent carbon atoms of a paraffin hydrocarbon.

We have obtained in the substitutive chlorination of propane and isobutane, in addition to 1,2-dichloropropane and 1,2-dichloro-2-methylpropane respectively, a considerable amount of other dichlorides of said hydrocarbons; and have found that in these dichlorides the 1,3-dichlorides are not only present, contrary to the commonly accepted rule above referred to, but are the ones which usually predominate.

We have also found that by controlling the conditions we may increase the proportion of these 1,3-dichlorides; by carrying out the chlorination procedure wholly at high temperature, whether in vapor-phase chlorination or in liquid-phase chlorination. In the latter case the temperature advantageously closely approaches the critical temperature. See our aforesaid co-pending applications Serial Nos. 590,046 and 723,366, now Patent Nos. 2,004,072 and 2,004,073; and our co-pending application Serial No. 25,632, filed June 8, 1935.

When propane is chlorinated, the variants in the chlorination products up to and including dichlorides, are shown by the following:

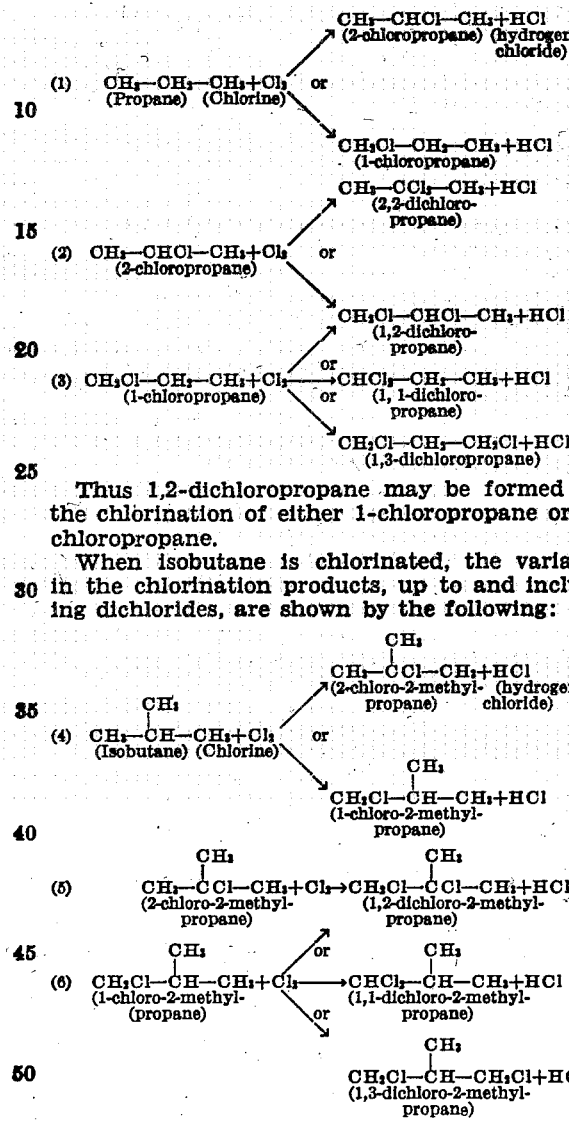

Thus 1,2-dichloropropane may be formed by the chlorination of either 1-chloropropane or 2-chloropropane.

When isobutane is chlorinated, the variants in the chlorination products, up to and including dichlorides, are shown by the following:

Thus 1,2-dichloro-2-methylpropane may be formed by the chlorination of either 1-chloro-2-methylpropane or 2-chloro-2-methylpropane, which are also called isobutyl chloride and tertiary butyl chloride respectively.

If chlorine substitution occurs on the number 2 carbon atom of any propane or isobutane molecule, however, in either the first step or the second step of the chlorination, it follows that no 1,3-dichloride is formed from that molecule. (Equations 2 and 5 thus yield no 1,3-dichloride.) Therefore, we prefer to operate under conditions which raise the proportion of chlorination of the primary carbon atoms, as by thermal chlorination at relatively high temperatures, in either liquid or vapor phase, to obtain maximum yields, first of primary monochlorides, and second of the desired 1,3-dichlorides; the optimum temperature being higher in vapor-phase chlorination than in liquid-phase chlorination. However, we have obtained substantial amounts of 1,3-dichlorides even at as low as −65° C., which is not only far below the critical temperature but far below the boiling point at normal pressure; so that our process includes not only chlorination under optimum conditions for primary-carbon chlorination, as thermal chlorination, whether in vapor-phase or liquid-phase, but also, either with or without thermal acceleration, a chlorination of propane or isobutane and/or their primary monochlorides under other conditions. Either photochemical or catalytic acceleration gives good results.

In thermal chlorination at relatively high temperatures, especially in vapor-phase chlorination, we prefer to heat both the chlorine and the hydrocarbon or monochloride separately to the desired reaction temperature, and to mix them at that temperature; for which purpose it is desirable, in order to prevent flame, that one of the fluids be injected into the other at a high velocity, so that it enters in excess of the speed of flame propagation, and to have such injection with a turbulent flow which produces an intimate mixing which enables the ingredients to become uniformly dispersed in each other before any considerable amount of chlorination takes place; for this avoids the formation of undue amounts of highly chlorinated products, which are formed if the reaction occurs in the presence of a local excess of chlorine.

In the chlorination process, both polychlorinated products and monochlorinated products are obtained. By providing sufficient chlorine, at one or more jets, and re-cycling the monochlorides, the proportion of dichlorides to monochlorides obtained may be increased.

In any of these cases, the chlorination of propane or isobutane yields chlorides other than the desired 1,3-dichloride. These other chlorides, whether monochlorides or polychlorides, are desirably suitably separated from the desired 1,3-dichloride, conveniently by rectification. That can readily be done, on account of the fairly wide differences in the boiling points involved.

We may separate the primary monochloride from the 2-chloro derivative obtained according to equations 1 and 4, and also from any polychlorides which are produced at the same time; then recycle the primary monochloride to chlorinate it in accordance with equation 3 or 6, desirably under conditions which yield a maximum amount of the 1,3-dichloride; and then separate the 1,3-dichloride from other chlorides present.

The essential features of our process are the substitutive chlorination of either the hydrocarbon (propane or isobutane) or its primary monochloride, or both, to yield the 1,3-dichloride; and the separation of that 1,3-dichloride from other chlorides present.

We may carry out our process with various forms of apparatus. One suitable form for vapor-phase chlorination is essentially that of our co-pending application Serial No. 590,046, now Patent No. 2,004,072, or that of our co-pending application Serial No. 723,366, now Patent No. 2,004,073. One suitable form for liquid-phase chlorination is essentially that of our co-pending application Serial No. 25,632, filed June 8, 1935. The accompanying drawings show those apparatuses with some variation.

In those drawings: Fig. 1 is a diagrammatic view of an apparatus for vapor-phase chlorination; Fig. 2 is a fragmental diagrammatic view showing a modification of part of that apparatus; Fig. 3 is another fragmental diagrammatic view, showing another modification; and Fig. 4 is a diagrammatic view, also fragmental, of an apparatus for liquid-phase chlorination.

In the vapor-phase chlorination of Fig. 1, the hydrocarbon (propane or isobutane) to be chlorinated is supplied by a valved pipe 10 and the chlorine by a valved pipe 11. The hydrocarbon may, if desired, be diluted by an inert diluent, such as nitrogen, supplied by a pipe 9; but if so the diluent does not enter into the chemical reaction, although it does exert an effect on physical conditions, as by its capacity to absorb heat. This diluent is often desirable in the chlorination of propane or isobutane; but is especially desirable to get a quick heating of the material to be chlorinated if such material consists wholly of the primary monochloride, in which case the nitrogen supplied may be hot.

The proportions of the hydrocarbon and the chlorine are desirably controlled to keep the chlorine present below that necessary for an explosive mixture.

The hydrocarbon-supply pipe 10 and the chlorine-supply pipe 11 preferably lead to separate vaporizing and/or preheating coils 12 and 13 respectively, located in a suitable heating device 14; which is conveniently an ordinary bath of water or of molten salts according to the temperature desired. Ordinarily the hydrocarbon and chlorine supplied are in liquid form, so that vaporization is necessary to get them into the gaseous phase in which we conduct our process in this apparatus; and desirably we preheat both the hydrocarbon and the chlorine additionally in the coils 12 and 13, to raise them to a desired reaction temperature before mixing them. This is desirable to obtain a maximum proportion of primary monochloride in the monochlorides formed, and of 1,3-dichloride in the dichlorides formed; and to obtain these maximum proportions in thermal chlorination the temperature to which the gases are raised before being mixed should be at least 250° C., and desirably should be in the neighborhood of about 500° C. but not over 600° C. These desired temperatures are usually lower than that in photochemical and in catalytic chlorination, as well as in liquid-phase chlorination.

The hydrocarbon (propane or isobutane) and the chlorine, either or both treated if desired, desirably pass separately as gases to a reaction passage 16, where they are mixed at high velocity and react. The velocity of injection of one gas into the other, as has already been stated, should be greater than the speed of flame propagation of the chlorination reaction, and is usually of the order of fifty to a hundred miles per minute. The chlorine supplied is under sufficient pressure to produce this speed. The reaction tube 16 is desirably a crooked one, as is shown in Figs. 1 and 3, to create a turbulence which produces intimate diffusion of the hydrocarbon and the chlorine in each other before any considerable chlorination has occurred, so that flame is effectively prevented and the formation of free carbon lessened and practically avoided. However, especially in photochemical or catalytic chlorination, the reaction passage may be in the form of a straight tube 16ª, as is shown in Fig. 2. The chlorine is injected into the reaction tube 16 or 16ª by one or more jets 15. A single jet is shown in Figs. 1 and 2, and a plurality of jets 15 in Fig. 3. When there are a plurality of such jets 15, they are desirably arranged at spaced points along the crooked reaction tube 16, as is clear from Fig. 3, so that the reaction of the chlorine injected at one jet may be completed or nearly so before the chlorine from the next jet is introduced. The reaction passage, especially if it is a crooked one as is the reaction passage 16 in Figs. 1 and 3, is desirably immersed in a bath 17, as of molten salts, to absorb the heat of the reaction, which is an exothermic one; although if the chlorination is photochemical or catalytic, such bath 17 may be omitted, as in Fig. 2. Suitable burners 18 may be provided for heating the bath containing the coils 12 and 13, and for initially heating the heat-absorbing bath 17.

When the chlorination is to be a photochemical chlorination, suitable light-giving devices, such as incandescent bulbs 19, may be provided around the reaction tube 16ª; if the reaction tube is made of some material, such as silica or glass, which permits the passage through its walls of the reaction-accelerating light. When the chlorination is to be catalytic, any suitable catalyst 20 may be put in the reaction tube 16ª. Both photochemical and catalytic acceleration may be used, as is shown in Fig. 2. Various catalysts may be used: such as granular carbon, cupric chloride, nickel chloride, or other known chlorination catalysts; as well as olefines, the presence of which accelerates substitutive chlorination in saturated compounds. If desired, a plurality of reaction-accelerating expedients may be used, such as heat and light, or heat and a catalyst, or light and a catalyst, or light and heat and a catalyst. In general, the temperature of the reaction may be lowered if a catalyst or light is used to accelerate the reaction.

The reaction products, with any recycled unreacted hydrocarbon (propane or isobutane), for desirably there is an excess of hydrocarbon so that the formation of trichlorides and more highly chlorinated products is minimized, pass from the reaction tube 16 or 16ª immediately to the worm 21 of a cooler 22; by which they are cooled quickly to a temperature in the neighborhood of room temperature. This immediate cooling lessens pyrolysis.

From the worm 21, the reaction products pass to a rectifying column 23, of any suitable type. The temperatures in this rectifying column 23 are so controlled that the chlorinated hydrocarbons or mixed chlorides pass as liquid to the bottom of the column whence they may be drawn off through a pipe 24.

The remaining mixture of hydrogen chloride and unreacted hydrocarbon, together with the inert diluent (such as nitrogen) if any is present, pass out at the top of the rectifying column 23, and is divided in conventional manner by a dephlegmator 25 and a wier-box 26 into reflux and take-off portions, which pass respectively by a valved reflux pipe 27 to the rectifying column 23 and into a valved take-off pipe 28. The ratio between reflux and takeoff may be controlled by the valves 29 and 30 in these two pipes.

The pipe 28 delivers the hydrogen chloride and unreacted hydrocarbon (propane or isobutane) and any inert diluent to the bottom of a water-scrubber 31, of any conventional form; in which the water takes up the hydrogen chloride present. This hydrochloric acid passes out from the bottom of the water-scrubber 31 to a receiver 32. Any vapors which rise in the water-scrubber 31 pass off from the top thereof through a pipe 33 to an alkali-scrubber 34. A take-off pipe 35 from the alkali-scrubber 34 leads through a recycling pump 36 back to the hydrocarbon-supply pipe 10; so that the unreacted hydrocarbon may be recycled to cause its chlorination.

The chlorinated hydrocarbons or mixed chlorides drawn off from the column 23 by pipe 24 may be supplied to a suitable storage receptacle 43 through a valved outlet 44. However, these chlorinated hydrocarbons are a mixture, and it is usually desirable to separate some from others. To this end, they may be passed through any desired number of rectifying columns 45, 46, 47, 48, etc., to get any desired separation.

Conveniently the first separation, in column 45, will be between monochlorides and polychlorides. The monochlorides pass out at the top, and the polychlorides at the bottom. If desired, the mixed monochlorides, without further separation, may pass through a valved pipe 50 to a recycling pipe 51, provided with a recycling pump 52, for returning the mixed monochlorides to any convenient point in the hydrocarbon-vaporizing-and-heating tube 12; in which the recycled monochlorides are quickly heated, usually to at least 250° C., before they reach the jet 15 at which the mixing with chlorine takes place.

In some cases, however, the mixed monochlorides from the top of the rectifying column 45 are led to the rectifying column 46, which separates the two monochlorides. The lower-boiling monochloride, 2-chloropropane (B. P. 35° C.) or 2-chloro-2-methylpropane (B. P. 51.5° C.), passes out from the top of the column 46, and may be collected in a receptacle 53. The primary monochloride, 1-chloropropane (B. P. 46° C.) or 1-chloro-2-methylpropane (B. P. 69° C.), passes out from the bottom of the rectifying column 46, by a valved pipe 54, which leads to the recycling pipe 51. By closing the valve in the pipe 50 and opening the valve in the pipe 54, the recycling may be of the primary monochloride only, without contamination by the monochloride which can yield none of the desired 1,3-dichloride.

It is usually desirable to have a preheating device 63 in the pipe 51, for vaporizing and producing any desired preheating of the primary monochloride.

The mixed polychlorides from the bottom of the rectifying column 45 may pass to a rectifying column 47, in which a separation may be obtained on either side (speaking in terms of boiling-point sequence) of the desired 1,3-dichloride—that is, at a temperature either above or below the boiling point of such 1,3-dichloride (about 120.4° C. in the case of 1,3-dichloropropane, and about 136.0° C. in the case of 1,3-dichloro-2-methylpropane).

Conveniently, this separation is made at a lower temperature than that boiling point, between the desired 1,3-dichloride and the mixture of other dichlorides. Such mixture of other dichlorides passes out at the top of the rectifying column 47, to be collected in a receptacle 55, while a mixture of the 1,3-dichloride with any trichlorides passes out at the bottom of the rectifying column 47. The amount of trichlorides may be kept relatively small by using a large excess of material to be chlorinated over chlorine, so that only a small proportion is chlorinated at each pass through the reactor. It is of course desirable that the dichlorides be rigorously removed from the material to be recycled. What trichlorides there are may be substantially separated from the desired 1,3-dichloride by the rectifying column 48, from which the trichlorides pass out at the bottom into a receptacle 56, while the desired 1,3-dichloride passes out at the top into a receptacle 57. 1,2,2-trichloropropane, however, is difficultly separable from 1,3-dichloropropane, because of the closeness of boiling points.

Instead of making the first separation of polychlorides, in the rectifying column 47, at a lower temperature than the boiling point of the 1,3-dichloride, that first separation may be made at a higher temperature than that boiling point, by simply increasing the temperatures in that rectifying column so that the material which passes out from the top of the column 47 is a mixture of all the dichlorides while the liquid which passes out from the bottom is a mixture of products more highly chlorinated than the dichlorides. The latter mixture may then be further separated, as in the rectifying column 48, if desired; or it may be by-passed around the rectifying column 48 directly into the receiver 56. The mixture of the dichlorides in this procedure goes into the receptacle 55. The desired 1,3-dichloride may if desired be separated from the other dichlorides, by further rectification.

For simplification of illustration, the conventional dephlegmators and wier-boxes for separating the vapors which pass off at the top of a rectifying column into reflux and take-off portions are shown only in connection with one rectifying column 23, although ordinarily they would be used on all columns.

We desirably provide flow-meters 60 in the pipes 10, 11, and 51, to give information which facilitates the control of the quantities of reactants supplied.

In operating our process we usually maintain a constant supply of hydrocarbon by the pipe 10. But that is not necessary; for the chlorination to get the 1,3-dichloride may be of the primary monochloride alone. Such primary monochloride, obtained from any desired source, may be supplied by way of a pipe 61 through suitable valves to either pipe 39 or pipe 51, so that by opening a valve in either pipe 61 and closing the desired valves in the pipes 10 and 54, it is possible to operate the system simply to chlorinate that primary monochloride. In that case the rectifying column 46 would normally be shut off, by closing the valve at its entrance. If unreacted primary monochloride is to be recycled, the valve in the pipe 50 would be opened.

Ordinarily, however, as has already been stated, we prefer to provide a constant supply of hydrocarbon, by way of the valved pipe 10; so that there will be simultaneous chlorination both of the hydrocarbon, mainly to the monochlorides, and of the primary monochloride, mainly to the dichlorides, in the reaction tube.

So far as the literature records, we believe, no chlorination of either propane or isobutane to yield the 1,3-dichloride has ever previously been done; and prior processes which produce dichlorides of propane or isobutane have yielded only 1,2-dichlorides. If any such 1,3-dichloride was ever previously produced, it was not recognized; and it was not separated as such from co-present chlorides.

In the liquid-phase chlorination of Fig. 4, an excess of the liquid hydrocarbon (propane or isobutane) to be chlorinated is pumped from a hydrocarbon-storage tank 101 by a pump 102 to a mixing pipe 103 into which liquid chlorine is also pumped from a chlorine-storage tank 104 by a pump 105. From the mixing-pipe 103 the liquid mixture of chlorine with an excess of hydrocarbon flows through a reactor 106, where it is heated to cause reaction, to a cooler 107; and thence to suitable separating apparatus such as shown in Fig. 1, so that the unreacted hydrocarbon and the primary monochloride may be returned by the pipe 110 and recycled. Regulating valves 108 and 109 are provided at the outlets of the reactor 106 and cooler 107, to control the pressures within the reactor and the cooler respectively, and to make possible higher temperatures in the reactor while maintaining the liquid phase. If temperatures are desired above the critical temperature of the material to be chlorinated, as we find advantageous, we use the hydrocarbon in a solution of carbon tetrachloride, or other inert diluent with a sufficiently high critical temperature; in which case said diluent is separated from the unrecycled reaction products and recycled with the unreacted hydrocarbon and the primary monochloride.

We claim as our invention:—

1. The process of producing a 1,3-dichloro-paraffin having not to exceed 4 carbon atoms and not over 3 carbon atoms in a straight chain, which consists in substituting a chlorine atom for a hydrogen atom in a 1-chloro-paraffin having not to exceed 4 carbon atoms and not over 3 carbon atoms in a straight chain, by reacting said 1-chloroparaffin with elemental chlorine, and separating the 1,3-dichloro-paraffin so produced from co-present chlorides.

2. The process of producing a 1,3-dichloro-paraffin having not to exceed 4 carbon atoms and not over 3 carbon atoms in a straight chain, which consists in substituting a chlorine atom for a hydrogen atom in a 1-chloro-paraffin having not to exceed 4 carbon atoms and not over 3 carbon atoms in a straight chain, by reacting said 1-chloroparaffin with elemental chlorine at a temperature between —65° C. and the critical temperature of the material to be chlorinated, and separating the 1,3-dichloro-paraffin so produced from co-present chlorides.

3. The process of producing a 1,3-dichloro-paraffin having not to exceed 4 carbon atoms and not over 3 carbon atoms in a straight chain, which consists in substituting a chlorine atom for a hydrogen atom in a 1-chloro-paraffin having not to exceed 4 carbon atoms and not over 3 carbon atoms in a straight chain, by reacting said 1-chloroparaffin with elemental chlorine, with the material to be chlorinated in liquid phase and close to its critical temperature, and separating the 1,3-dichloro-paraffin so produced from co-present chlorides.

4. The process of producing a 1,3-dichloro-paraffin having not to exceed 4 carbon atoms and not over 3 carbon atoms in a straight chain, which consists in substituting a chlorine atom for a hydrogen atom in a 1-chloro-paraffin having not to exceed 4 carbon atoms and not over 3 carbon atoms in a straight chain, by reacting said 1-chloroparaffin with elemental chlorine, with the material to be chlorinated in liquid phase, and separating the 1,3-dichloro-paraffin so produced from co-present chlorides.

5. The process of producing 1,3-dichloro-2-methylpropane, which consists in substitutively chlorinating 1-chloro-2-methylpropane, and separating the 1,3-dichloro-2-methylpropane from co-present chlorides.

6. The process of producing 1,3-dichloropropane, which consists in substitutively chlorinating 1-chloropropane, and separating the 1,3-dichloropropane from co-present chlorides.

7. The process of producing 1,3-dichloro-2-methylpropane, which consists in substitutively chlorinating 1-chloro-2-methylpropane at a temperature below its critical temperature, and separating the 1,3-dichloro-2-methylpropane from co-present chlorides.

8. The process of producing 1,3-dichloropropane, which consists in substitutively chlorinating 1-chloropropane at a temperature below its critical temperature, and separating the 1,3-dichloropropane from co-present chlorides.

9. The process of producing 1,3-dichloro-2-methylpropane, which consists in substitutively chlorinating 1-chloro-2-methylpropane in liquid phase, and separating the 1,3-dichloro-2-methylpropane from co-present chlorides.

10. The process of producing 1,3-dichloropropane, which consists in substitutively chlorinating 1-chloropropane in liquid phase, and separating the 1,3-dichloropropane from co-present chlorides.

11. The process of producing 1,3-dichloro-2-methylpropane, which consists in substitutively chlorinating 1-chloro-2-methylpropane in liquid phase and at a temperature close to the critical temperature, and separating the 1,3-dichloro-2-methylpropane from co-present chlorides.

12. The process of producing 1,3-dichloropropane, which consists in substitutively chlorinating 1-chloropropane in liquid phase and at a temperature close to the critical temperature, and separating the 1,3-dichloropropane from co-present chlorides.

13. The process of producing a 1,3-dichloro-paraffin having not to exceed 4 carbon atoms and not over 3 carbon atoms in a straight chain, which consists in substituting a chlorine atom for a hydrogen atom in a 1-chloro-paraffin having not to exceed 4 carbon atoms and not over 3 carbon atoms in a straight chain, with the 1-chloro-paraffin dissolved in an inert diluent of higher critical temperature, and separating the 1,3-dichloro-paraffin so produced from co-present chlorides.

14. The process of producing a 1,3-dichloro-paraffin having not to exceed four carbon atoms and not over three carbon atoms in a straight chain, which consists in substitutively chlorinating a paraffin having carbon atoms as aforesaid, at a temperature above the critical temperature of said paraffin but with such paraffin dissolved in an inert liquid diluent of higher critical temperature, and separating the 1,3-dichloro-paraffin so produced from co-present chlorides.

15. The process of producing a 1,3-dichloro-paraffin having not to exceed 4 carbon atoms and not over 3 carbon atoms in a straight chain, which consists in substituting a chlorine atom for a hydrogen atom in a 1-chloro-paraffin having not to exceed 4 carbon atoms and not over 3 carbon atoms in a straight chain, with the 1-chloro-paraffin dissolved in carbon tetrachloride, and separating the 1,3-dichloro-paraffin so produced from co-present chlorides.

16. The process of producing a 1,3-dichloro-paraffin having not to exceed four carbon atoms and not over three carbon atoms in a straight chain, which consists in substitutively chlorinating a paraffin having carbon atoms as aforesaid, at a temperature above the critical temperature of said paraffin but with such paraffin dissolved in carbon tetrachloride, and separating the 1,3-dichloro-paraffin so produced from co-present chlorides.

HENRY B. HASS.
EARL T. McBEE.

CERTIFICATE OF CORRECTION.

Patent No. 2,147,577. February 14, 1939.

HENRY B. HASS, ET AL.

It is hereby certified that error appears in the printed specification of the above numbered patent requiring correction as follows: Page 3, first column, line 49, for the word "treated" read heated; and second column, line 6, for "obsorb" read absorb; and that the said Letters Patent should be read with this correction therein that the same may conform to the record of the case in the Patent Office.

Signed and sealed this 28th day of March, A. D. 1939.

Henry Van Arsdale.

(Seal) Acting Commissioner of Patents.